2,743,290

HALOGENATED SULFONIC ACID DERIVATIVES AND PROCESS FOR PREPARING SAME

John M. Stewart, Missoula, Mont., assignor to Phillips Petroleum Company, a corporation of Delaware No Drawing. Application September 22, 1952, Serial No. 310,915

15 Claims. (Cl. 260—453)

This invention relates to the reaction in aqueous media between selected halogens and selected olefins sulfides, and to products produced thereby. In one of its aspects this invention relates to a process for the production of halogenated sulfonyl halides. In another of its aspects this invention relates to a process for the production of halogenated thioesters of a sulfonic acid.

In accordance with this invention it has been found that when an olefin sulfide containing from 2 to 18 carbon atoms per molecule is reacted in aqueous medium with a halogen selected from the group consisting of chlorine and bromine under reaction conditions more fully described hereinafter, either a halogenated sulfonyl halide or a halogenated thioester of a sulfonic acid is produced, depending upon the ratio of reactants employed. These compounds are useful as intermediates in the preparation of other chemical products such as pharmaceuticals and dyes. They are also useful as softeners and plasticizers for synthetic polymeric resins, such as $SO_2$-olefin resins, and have potential use as agricultural chemicals.

It is an object of this invention to provide a method for the aqueous halogenation of olefin sulfides.

It is another object of this invention to provide a process for the production of halogenated sulfonyl halides.

It is a further object of this invention to provide a process for the production of halogenated thioesters of a sulfonic acid.

Still another object of this invention is to provide new chemical compounds belonging to the class of halogenated thioesters of halogenated sulfonic acids.

Other objects of this invention will be apparent from the accompanying disclosure and description.

The olefin sulfides employed in the present invention preferably contain from 2 to 18 carbon atoms per molecule, ethylene sulfide being the simplest member, and contain a sulfur atom attached to two directly connected carbon atoms, which may be represented structurally as follows:

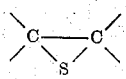

wherein the carbon atoms can be part of a ring or of an open chain of greater length. The dangling valences in the formula can be satisfied by radicals such as hydrocarbon, hydrogen, halogen, alkoxy, thioalkyl, carboxy, nitro and cyano. The hydrocarbon radical includes alkyl, cycloalkyl, aryl, alkaryl, aralkyl, alkenyl, cycloalkenyl, alkynyl and cycloalkynyl, and each can be substituted by any of the above-mentioned groups, viz, halogen, alkoxy, thioalkyl, carboxy, nitro and cyano. It is preferred that no more than one of the dangling valences be satisfied by radicals other than hydrogen and hydrocarbon. A preferred class of olefin sulfides includes those in which the dangling valences in the above formula are satisfied by hydrogen, alkyl, cycloalkyl, aryl, alkaryl and aralkyl radicals. As examples of olefin sulfides suitable for use in the process of the present invention, in addition to ethylene sulfide, the following may be mentioned: propylene sulfide, isobutylene sulfide, 1,2-butene sulfide, 2,3-butene sulfide, 3,4-hexene sulfide, 4,5-decene sulfide, 5,6-dodecene sulfide, 3,4-hexadecene sulfide, 9,10-octadecene sulfide and higher alkene sulfides; cyclic olefin sulfides such as cyclopentene sulfide, cyclohexene sulfide, and the like; and substituted olefin sulfides, as for example, phenylethylene sulfide, tolylethylene sulfide, cyclohexylethylene sulfide, phenylpropylene sulfide, chloropropylene sulfide, 3-cyano-1,2-propene sulfide, 2-chloro-2,3-decene sulfide, 5-ethyl-3,4-octene sulfide, 5-chloro-2,3-octene sulfide, 2-methyl-5-phenyl-2,3-pentene sulfide, 1-chlorophenyl-2,3-butene sulfide, 2,3-dimethyl-2,3-hexene sulfide, 1-chloro-3,4-cyclohexene sulfide, 1,4-diethyl - 2,3 - cyclohexene sulfide, 1 - (β - chloroethyl)2,3 - cyclohexene sulfide, 2-bromo-5-ethyl-5,6-nonene sulfide, 2-bromo-3,4-nonene sulfide, 3-ethoxy-5,6-octene sulfide, 6-thioethyl-2,3-dodecene sulfide, 4-carboxy-6,7-decene sulfide, 3-nitro-4,5-octene sulfide and the like.

In its broadest aspect my invention is directed to the reaction in aqueous medium of olefin sulfides with a halogen selected from the group consisting of chlorine and bromine. According to one embodiment of my invention the reaction takes place in a molecular ratio of 3 molecules of halogen per molecule of sulfide and proceeds according to the following equation:

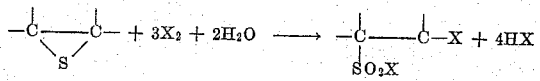

wherein X is the selected halogen and each dangling valence is satisfied as hereinbefore described. Those skilled in the art will appreciate that if aliphatic unsaturation exists in the olefin sulfide the unsaturated bond will be subject to attack by the halogen. However, this will not affect the direction of the primary reaction if additional halogen in the correct stoichiometric ratio is employed to account for the halogenation of the unsaturated bond.

In carrying out this particular embodiment, a preferred practice is to add slowly the olefin sulfide to a saturated aqueous solution of the halogen while agitating the reaction mixture. It is necessary that an excess quantity of halogen over that required be maintained during the reaction period. This can be accomplished by the continuous addition of halogen to the mixture during and after the addition of sulfide if necessary. The amount of water present in the reaction mixture is within the range of from 1 to 20, preferably from 5 to 10, parts by weight per part of sulfide. It is desirable that the reaction mixture be agitated during the reaction period which period will vary between 15 minutes and 10 hours. However, a reaction time of from 1 to 5 hours is generally sufficient and preferably employed. While a temperature within the range of minus 20 to plus 30° C. can be employed, a preferred reaction temperature in the range of 0 to 15° C. is maintained, sufficient to maintain the aqueous medium in the liquid phase. The pressure may be varied but ordinary atmospheric pressure is conveniently used in carrying out the reaction. Care should be taken, however, to avoid extreme pressures in the case of chlorine which might cause undesirable side reactions. The yield of product can be increased by the addition of acetic acid to the aqueous medium in an amount up to 5 parts by weight per part of water.

After the reaction has been completed excess halogen is removed from the mixture and the product, which is generally in the form of an oily substance, is separated from the aqueous phase. The oily product is washed several times with ice water and then dried over a suitable desiccant such as anhydrous calcium chloride. The product can be purified by distillation or crystallization, whichever is appropriate.

According to another embodiment of my invention, the reaction between halogen and olefin sulfide in aqueous medium takes place in a molecular ratio of 1.5 to 1 and proceeds according to the equation:

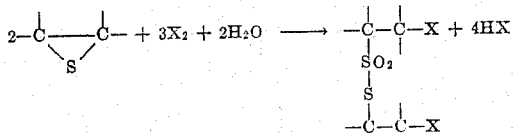

wherein X is the selected halogen and the dangling valences satisfied as hereinbefore described. This reaction can be accomplished under the same conditions of temperature, pressure, reaction time and aqueous medium as for the first reaction hereinbefore described. The essential difference is that the amount of halogen employed is carefully controlled to not greater than the stoichiometric amount as per the equation just stated. If aliphatic unsaturation exists in the olefin sulfide the stoichiometric ratio must be adjusted to account for attacking of the unsaturated bond by the halogen employed. The primary reaction will not be affected if this is done.

After the reaction is complete the product, which is generally an oily substance, is allowed to settle out from the aqueous reaction mixture. This can be hastened by the addition of cold brine. Preferably, though not necessarily, the mixture is extracted with ether and the extracts combined and washed successively with cold water and brine. The product is then dried over a suitable desiccant such as anhydrous calcium chloride. The product can be purified by distillation or crystallization, whichever is more appropriate.

It should be noted that in each of the reactions the addition of halogen is always in the position beta to the functional sulfur-containing group. Further, the halogen will add to that beta carbon atom in the olefin sulfide which is lowest in degree. That is, if the two carbon atoms to which the sulfur is linked in the olefin sulfide vary in degree, e. g., one is secondary and the other primary, as for example, propylene sulfide, the halogen will add to the primary carbon.

The following examples are merely illustrative of the underlying principles of my invention and should not be construed as unduly limiting.

*Example I*

14.8 grams (0.2 mol) of propylene sulfide was added dropwise with stirring to 100 ml. of saturated chlorine water, the dropping funnel having its end below the surface of the water to suppress direct chlorination. Concurrently chlorine was bubbled through the mixture at such a rate that an excess was always present. The reaction temperature was maintained at 0 to 15° C. by means of an ice bath and control of the rate of addition of chlorine. The addition of propylene sulfide was complete in one and one-half hours, at which time the rate of chlorine addition was decreased and stirring was continued for one hour. Air was then blown through the mixture to remove excess chlorine. The heavy oily product was separated, washed three times with ice water and dried over anhydrous calcium chloride. On distillation, the product, 1-chloro-2-propanesulfonyl chloride, boiled at 55–56° C. at 1 mm. or 77–78° C. at 8 mm. pressure. It had a refractive index at 20° C. of 1.4859. Yields averaged 70 per cent of theory.

Yields can be improved, however, by using dilute acetic acid as chlorination medium rather than just water.

The structure of the product was proved to be

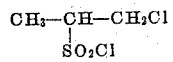

and not the isomeric product with the sulfur-containing group on the primary carbon atom. This was done by treating the product with N-methylaniline. The resulting product was then compared with the ultimate product of the following unequivocal synthesis:

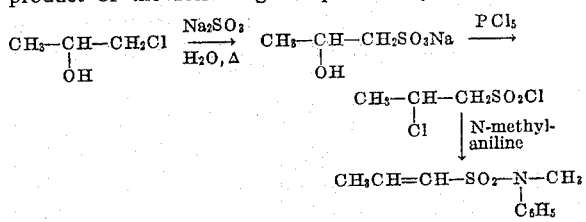

The two compounds have the same analysis but were not identical, differing in melting point; and a mixed melting point showed a large depression.

*Example II*

Chloropropylene sulfide when substituted for propylene sulfide in the process of Example I gave about a 50 per cent yield of colorless oil boiling at 84–87° C. at 1 mm. pressure and having a refractive index at 20° C. of 1.5140.

The structure of the product is

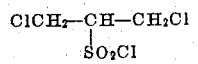

and not the isomeric product with the sulfur-containing group on the primary carbon atom.

*Example III*

In accordance with the equation:

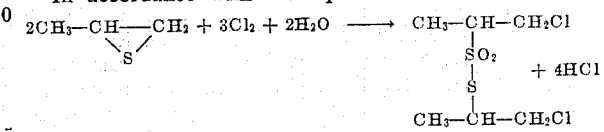

the theoretical amount of chlorine (9.5 ml., 14.8 g., 0.21 mol) required to react with 0.135 mol of propylene sulfide was collected in a graduated tube chilled by Dry Ice and then allowed to vaporize slowly, the gaseous chlorine being passed under the surface of a mixture of the propylene sulfide, 50 ml. of glacial acetic acid, and 12 ml. of water which was cooled externally by means of an ice bath and mechanically stirred. The mixture was a clear solution at the start, became cloudy as the chlorine was passed into it, and became a clear solution again just before the addition of chlorine was complete. The ice bath was removed and stirring continued for ten minutes at room temperature. The mixture was then diluted with 200 ml. of cold brine and an oil settled out. The mixture was then extracted twice with ether. The ether extracts were combined, washed twice with ice water and once with cold brine, and dried over anhydrous calcium chloride. The ether was removed at room temperature using an aspirator. The crude product weighed 13 g. On distillation in vacuo a forerun of 2 ml. B. P. range 58–126° C. (1 mm.) was first obtained, then the main fraction was taken over at a boiling point range of 127–137° C. (1 mm.). The product had a refractive index at 20° C. of 1.5283. The yield was 50 per cent of theory.

The product obtained is intermediate between the bis (1-methyl-2-chloroethyl) disulfide obtained in the anhydrous chlorination of propylene sulfide as disclosed and claimed in my copending application Serial No. 310,914, filed September 22, 1952 and the 1-chloro-2- propanesulfonyl chloride obtained by running the aqueous chlorination of propylene sulfide to completion, and is a chlorinated thioester of a sulfonic acid.

While this invention has been described in terms of its preferred embodiments those skilled in the art will readily appreciate that modifications may be made without departing from the spirit and scope of the invention.

I claim:

1. A method which comprises reacting at a temperature in the range of −20 to +30° C. and in a molecular ratio of at least 1½:1 in an aqueous medium a halogen selected from the group consisting of chlorine and bromine with an olefin sulfide having from 2 to 18 carbon atoms and having the sulphur atom attached to two directly connected carbon atoms, to produce a beta-halogenated sulphonic acid derivative.

2. The method which comprises reacting at a temperature in the range of from −20 to +30° C. and in a molecular ratio of at least 3:1 in an aqueous medium a halogen selected from the group consisting of chlorine and bromine with an olefin sulfide having from 2 to 18 carbon atoms and having the sulphur atom attached to two directly connected carbon atoms, to produce a beta-halogenated sulfonyl halide.

3. The method which comprises reacting at a temperature in the range of −20 to +30° C. and in a molecular ratio of about 3:2 in an aqueous medium a halogen selected from the group consisting of chlorine and bromine with an olefin sulfide having from 2 to 18 carbon atoms and having the sulphur atom attached to two directly connected carbon atoms, to produce a beta-halogenated thioester of a sulfonic acid.

4. A process for producing a beta-halogenated sulfonyl halide from a halogen selected from the group consisting of chlorine and bromine and an olefin sulfide containing from 2 to 18 carbon atoms per molecule and having the sulphur atom attached to two directly connected carbon atoms, which comprises admixing with agitation one molecular equivalent of said olefin sulfide with at least three molecular equivalents of said halogen in an aqueous medium comprising from 1 to 20 parts by weight water per part sulfide, maintaining excess halogen in said reaction mixture, agitating said reaction mixture at a temperature within the range of minus 20 to plus 30° C. sufficient to maintain a liquid phase, at about atmospheric pressure, for a duration of time in the range of 15 minutes to 10 hours, and recovering a beta-halogenated sulfonyl halide from the reaction mixture as a product of the process.

5. A process according to claim 4 in which propylene sulfide and chlorine are reacted and 1-chloro-2-propanesulfonyl chloride is recovered as a product.

6. A process according to claim 4 in which chloropropylene sulfide and chlorine are reacted and 1,3-dichloro-2-propanesulfonyl chloride is recovered as a product.

7. A process according to claim 4 in which cyclohexene sulfide and chlorine are reacted and 1-chloro-2-cyclohexanesulfonyl chloride is recovered as a product.

8. The process according to claim 4 wherein said aqueous medium comprises from 1 to 20 parts by weight water per part sulfide and up to 5 parts by weight acetic acid per part water.

9. A process for producing a halogenated thioester of sulfonic acid from a halogen selected from the group consisting of chlorine and bromine and an olefin sulfide containing from 2 to 18 carbon atoms per molecule and having the sulphur atom attached to two directly connected carbon atoms, which comprises admixing with agitation 2 mols of said olefin sulfide with 3 mols of said halogen in an aqueous medium comprising from 1 to 20 parts of the weight of water per part sulfide, maintaining the reaction mixture with agitation at a temperature in the range of minus 20 to plus 30° C. sufficient to maintain a liquid phase, at about atmospheric pressure, for a duration of from 15 minutes to 10 hours, and recovering a beta-halogenated thioester of a sulfonic acid as a product of the process.

10. A process according to claim 9 in which propylene sulfide and chlorine are reacted.

11. A process according to claim 9 in which chloropropylene sulfide and chlorine are reacted.

12. A process according to claim 9 in which cyclohexene sulfide and chlorine are reacted.

13. The process according to claim 9 wherein said aqueous medium comprises from 1 to 20 parts by weight water per part sulfide and up to 5 parts by weight acetic acid per part water.

14. A chemical compound containing the structure

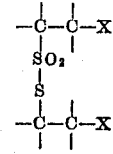

wherein X is a halogen selected from the group consisting of chlorine and bromine and wherein each dangling valence is satisfied by a radical selected from the group consisting of hydrogen, hydrocarbon, halogen, alkoxy, thioalkyl, carboxy, nitro, cyano and halo, alkoxy, thioalkyl, nitro and cyano substituted hydrocarbon, said compound containing no more than 36 carbon atoms per molecule.

15. A new chemical compound having the formula:

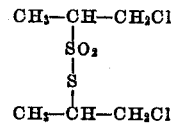

References Cited in the file of this patent

UNITED STATES PATENTS

| | | |
|---|---|---|
| 2,598,014 | Proell et al. | May 27, 1952 |
| 2,623,069 | Wilkes | Dec. 23, 1952 |